US009923756B2

(12) United States Patent
Waldo

(10) Patent No.: US 9,923,756 B2
(45) Date of Patent: Mar. 20, 2018

(54) MAINTENANCE ENTITY GROUP END POINT OF A SUBNETWORK WITHIN A MULTI-DOMAIN NETWORK

(71) Applicant: ADVA Optical Networking SE, Meiningen (DE)

(72) Inventor: Michael Waldo, Richardson, TX (US)

(73) Assignee: ADVA OPTICAL NETWORKING SE, Meningen (DE)

( * ) Notice: Subject to any disclaimer, the term of this patent is extended or adjusted under 35 U.S.C. 154(b) by 34 days.

(21) Appl. No.: 14/484,223

(22) Filed: Sep. 11, 2014

(65) Prior Publication Data

US 2016/0080193 A1 Mar. 17, 2016

(51) Int. Cl.
*H04L 1/00* (2006.01)
*H04L 12/24* (2006.01)
*H04L 12/26* (2006.01)

(52) U.S. Cl.
CPC .......... *H04L 41/06* (2013.01); *H04L 41/0213* (2013.01); *H04L 43/0811* (2013.01)

(58) Field of Classification Search
CPC ................................ H04L 41/06; H04L 43/50
See application file for complete search history.

(56) References Cited

U.S. PATENT DOCUMENTS

| | | | |
|---|---|---|---|
| 2006/0007867 A1* | 1/2006 | Elie-Dit-Cosaque | H04L 41/0893 370/241.1 |
| 2006/0133284 A1 | 6/2006 | Elie-Dit-Cosaque et al. | |
| 2007/0014290 A1 | 1/2007 | Dec et al. | |
| 2008/0049757 A1* | 2/2008 | Bugenhagen | H04L 12/2602 370/395.1 |
| 2008/0219172 A1* | 9/2008 | Mohan | H04L 12/2602 370/241.1 |
| 2008/0219173 A1* | 9/2008 | Yoshida | H04L 43/50 370/241.1 |
| 2008/0279107 A1* | 11/2008 | Sridhar | H04L 41/12 370/241 |
| 2008/0291823 A1* | 11/2008 | Saltsidis | H04L 41/0677 370/216 |
| 2009/0161573 A1* | 6/2009 | Takase | H04L 41/142 370/252 |
| 2009/0168663 A1* | 7/2009 | Friskney | H04L 41/0806 370/254 |
| 2009/0276830 A1* | 11/2009 | O'Connor | H04L 63/0428 726/3 |

(Continued)

OTHER PUBLICATIONS

"Service OAM Fault Management Implementation Agreement," Technical Specification MEF 30, The Metro Ethernet Forum, pp. 1-40 (Jan. 2011).

(Continued)

*Primary Examiner* — Gregory Sefcheck
*Assistant Examiner* — Jael Ulysse
(74) *Attorney, Agent, or Firm* — Jenkins, Wilson, Taylor & Hunt, P.A.

(57) ABSTRACT

A Maintenance Entity Group, MEG, End Point, MEP, of a subnetwork within a multi-domain network, said MEP comprising an encapsulation unit configured to encapsulate SOAM frames received by a passive Service Access Point, SAP, of the MEP and a decapsulation unit configured to decapsulate encapsulated SOAM frames received by an active Service Access Point, SAP, of the MEP.

18 Claims, 8 Drawing Sheets

(56) References Cited

U.S. PATENT DOCUMENTS

| | | | |
|---|---|---|---|
| 2010/0039943 A1* | 2/2010 | Ryoo | H04L 43/0835 370/242 |
| 2010/0278048 A1* | 11/2010 | Sawaguchi | H04L 12/4625 370/241.1 |
| 2011/0051748 A1* | 3/2011 | Mitsumori | H04L 43/0811 370/476 |
| 2011/0154099 A1* | 6/2011 | Ganesh | G06F 11/0709 714/4.1 |
| 2011/0167119 A1* | 7/2011 | Wan | H04L 43/10 709/206 |
| 2011/0279258 A1* | 11/2011 | Unger | H04L 41/0627 340/501 |
| 2012/0008491 A1* | 1/2012 | Shimada | H04L 12/4633 370/218 |
| 2012/0020206 A1* | 1/2012 | Busi | H04L 12/24 370/217 |
| 2012/0120955 A1* | 5/2012 | Vissers | H04L 12/413 370/392 |
| 2012/0226824 A1* | 9/2012 | Trnkus | H04W 16/18 709/250 |
| 2012/0287776 A1* | 11/2012 | Inaba | H04L 45/22 370/217 |
| 2013/0051243 A1* | 2/2013 | Senthivel | H04L 49/208 370/241.1 |
| 2013/0114394 A1* | 5/2013 | Hu | H04L 41/0816 370/216 |
| 2013/0121164 A1* | 5/2013 | Shabtay | H04L 41/0663 370/241.1 |
| 2013/0128749 A1* | 5/2013 | Krzanowski | H04L 41/0213 370/241.1 |
| 2013/0163418 A1* | 6/2013 | Lee | H04L 47/522 370/230 |
| 2013/0194911 A1* | 8/2013 | Fedyk | H04L 43/0811 370/217 |
| 2013/0315071 A1* | 11/2013 | Yoshida | H04L 43/0817 370/241.1 |
| 2013/0329565 A1* | 12/2013 | Holness | H04L 43/0811 370/241.1 |
| 2014/0016479 A1* | 1/2014 | Coomber | H04L 12/413 370/241.1 |
| 2014/0022886 A1 | 1/2014 | Sinha et al. | |
| 2014/0092751 A1 | 4/2014 | Meilik et al. | |
| 2014/0098762 A1* | 4/2014 | Ghai | H04W 76/02 370/329 |
| 2014/0133289 A1* | 5/2014 | Jadav | H04L 43/0811 370/216 |
| 2014/0153406 A1* | 6/2014 | Brolin | H04L 43/50 370/241.1 |
| 2014/0169179 A1* | 6/2014 | Ding | H04L 43/0811 370/241.1 |
| 2014/0169783 A1* | 6/2014 | Surek | H04B 10/0791 398/10 |
| 2015/0049641 A1* | 2/2015 | Pugaczewski | H04L 45/02 370/254 |
| 2015/0289176 A1* | 10/2015 | Liu | H04W 36/0083 370/331 |
| 2016/0028602 A1* | 1/2016 | Mishra | H04L 43/0811 370/236.2 |

OTHER PUBLICATIONS

"Series Y: Global Information Infrastructure, Internet Protocol Aspects and Next-Generation Networks; Internet protocol aspects—Operation, administration and maintenance—OAM functions and mechanisms for Ethernet based networks," Y.1731, ITU-T, Telecommunication Standardization Sector of International Telecommunication Union, pp. 1-80 (2006).

Extended European Search Report for European Patent Application No. 15158755.7 (Jan. 20, 2016).

\* cited by examiner

MAINTENANCE ENTITY GROUP END POINT OF A SUBNETWORK WITHIN A MULTI-DOMAIN NETWORK

FIELD OF THE INVENTION

The invention relates to a maintenance entity group end point, MEP, of a subnetwork with a multi-domain network and to a method for transporting Service Operation Administration Maintenance, SOAM, frames through a multi-domain network comprising subnetworks delimited by maintenance entity group end points MEPs of a maintenance entity group MEG.

TECHNICAL BACKGROUND

As the complexity of networks increases, service providers require a robust set of management tools to maintain service networks, in particular Ethernet service networks. Ethernet service OAM (Operation, Administration and Maintenance) encompasses fault management and performance management capabilities that are incorporated in network elements that support Ethernet services.

Maintenance domains form management space on a network, typically owned and operated by a single entity. Maintenance domains can be configured as names and levels. A hierarchical relationship can exist between domains based on levels. The larger the domain the higher is usually the level value. Ethernet service OAM, SOAM, defines eight maintenance entity group (MEG) levels for monitoring network segments within a single VLAN sub-network. A desired attribute of Y.1731 and 802.1Q is that they provide a general mechanism for OAM. All monitoring measuring is done between two well-defined points in the network. No matter whether an Ethernet physical connection or an Ethernet service through the CEN or an Ethernet virtual connection, EVC, within the domain of a service provider, i.e. an OVC, is monitored, the protocols and tools are the same. The two well-defined points in the network constitute a Maintenance Entity or ME. All of the maintenance entities MEs that are associated with the same Ethernet connection are grouped together in a Maintenance Entity Group MEG. Each MEG has a Maintenance Entity Group level associated with it. MEGs are defined hierarchically and the MEG level defines, where the MEG is in the OAM hierarchy. Eight MEG levels may be sufficient when an entire subnetwork is managed and monitored by a single operator. However, end-to-end services that traverse multiple operator networks may have MEG level conflicts when an operator uses MEG levels that overlap with MEG levels used by other operators in the same service. In particular, nested or chained services often have overlapping MEG levels. In a conventional multi-domain network comprising subnetworks delimited by Maintenance Entity Group, MEG, End Points, MEPs, the service providers and operators often use predefined default SOAM levels for the services with no MEG level flexibility in their service offerings.

Accordingly, there is a need to provide a method and apparatus for transporting Service Operation Administration Maintenance, SOAM, frames through a multi-domain network which provide MEG level flexibility to eliminate overlapping MEG levels.

SUMMARY OF THE INVENTION

According to a first aspect of the present invention, a multi-domain network comprising subnetworks delimited by Maintenance Entity Group, MEG, End Points, MEPs, of a Maintenance Entity Group, MEG, is provided, wherein the MEPs are configured to encapsulate Service Operation Administration Maintenance, SOAM, frames received by the MEP and to forward the encapsulated SOAM frames to a peer MEP of said MEP within the same Maintenance Entity Group, MEG.

In a possible embodiment of the multi-domain network according to the first aspect of the present invention, said MEP comprises a passive Service Access Point, SAP, adapted to receive the SOAM frames and an active Service Access Point, SAP, adapted to forward after encapsulation by the MEP the encapsulated SOAM frames to the peer MEP of said MEG.

In a possible embodiment of the multi-domain network according to the first aspect of the present invention, the peer MEP comprises an active SAP adapted to receive the encapsulated SOAM frames and a passive SAP adapted to forward the decapsulated SOAM frames after decapsulation by said peer MEP.

In a possible embodiment of the multi-domain network according to the first aspect of the present invention, the Maintenance Entity group, MEG, comprises Maintenance Entities, MEs, associated with the same point-to-point or point-to-multipoint Ethernet connection.

In a further possible embodiment of the multi-domain network according to the first aspect of the present invention, the Maintenance Entity Group, MEG, has a MEG level associated with it.

In a still further possible embodiment of the multi-domain network according to the first aspect of the present invention, the subnetworks of said multi-domain network are nested and/or chained with each other.

In a still further possible embodiment of the multi-domain network according to the first aspect of the present invention, each Maintenance Entity Group, MEG, End Points, MEPs, comprises:
an encapsulation unit configured to encapsulate SOAM frames received at a passive SAP of the MEP and a decapsulation unit configured to decapsulate encapsulated SOAM frames received at an active SAP of the MEP.

The invention further provides according to a second aspect a Maintenance Entity Group, MEG, End Point, MEP, of a subnetwork within a multi-domain network, said MEP comprising:
an encapsulation unit configured to encapsulate Service Operation Administration Maintenance, SOAM, frames received by a passive Service Access Point, SAP, of the MEP and
a decapsulation unit configured to decapsulate encapsulated SOAM frames received by an active Service Access Point, SAP, of the MEP.

In a possible embodiment of the Maintenance Entity Group End Point, MEP, according to the second aspect of the present invention, the encapsulation unit is configured to encapsulate the received SOAM frames at the MEG level of said MEP.

In a further possible embodiment of the Maintenance Entity Group End Point, MEP, according to the second aspect of the present invention, the subnetwork comprises a network of a service provider, a network of a network operator and/or a network of an access provider.

In a still further possible embodiment of the Maintenance Entity Group End Point, MEP, according to the second aspect of the present invention, the MEP comprises an UP MEP or a DOWN MEP.

In a still further possible embodiment of the Maintenance Entity Group End Point, MEP, according to the second aspect of the present invention, the MEP comprises a configuration register storing the MEG level of said MEP.

The invention further provides according to a third aspect an interface device of a multi-domain network comprising a Maintenance Entity Group End Point, MEP, of a Maintenance Entity Group, MEG, wherein said MEP comprises:

an encapsulation unit configured to encapsulate Service Operation Administration Maintenance, SOAM, frames received at a passive Service Access Point, SAP, of the MEP and a decapsulation unit configured to decapsulate encapsulated SOAM frames received at an active SAP of the MEP.

In a possible embodiment of the interface device according to the third aspect of the present invention, the interface device comprises a user network interface, UNI, device.

In a still further possible embodiment of the interface device according to the third aspect of the present invention, the interface device comprises a network-network interface, NNI, device.

The invention further provides according to a fourth aspect a method for transporting Service Operation Administration Maintenance, SOAM, frames through a multi-domain network comprising subnetworks delimited by Maintenance Entity Group, MEG, End Points, MEPs, of a Maintenance Entity Group, MEG, the method comprising:
encapsulating received SOAM frames by a MEP and forwarding the encapsulated SOAM frames to a peer MEP of said MEP within the same Maintenance Entity Group, MEG.

In a possible embodiment of the method according to the fourth aspect of the present invention, the SOAM frames are received at a passive Service Access Point, SAP, of said MEP and forwarded after encapsulation via an active SAP of said MEP to the peer MEP of said MEG.

In a still further possible embodiment of the method according to the fourth aspect of the present invention, the forwarded encapsulated SOAM frames are received by an active SAP of the peer MEP and decapsulated by the peer MEP to be forwarded.

In a still further possible embodiment of the method according to the fourth aspect of the present invention, the MEP encapsulates the received SOAM frames by adding a header to said SOAM frames, said header comprising a MEL data field storing the MEG level value of the MEG level of said MEP.

In a possible embodiment of the method according to the fourth aspect of the present invention, the added header further comprises
a protocol version, an opcode, flags, a TLV offset and an organizational unique identifier, OUI and/or a standardized opcode specific to encapsulation.

In a still further possible embodiment of the method according to the fourth aspect of the present invention, the MEL data field of the header comprises at least 3 bits to distinguish at least 8 different MEG levels.

BRIEF DESCRIPTION OF FIGURES

In the following, exemplary embodiments of the different aspects of the present invention are described in more detail with reference to the enclosed figures.

DETAILED DESCRIPTION OF EMBODIMENTS

Figure 1:
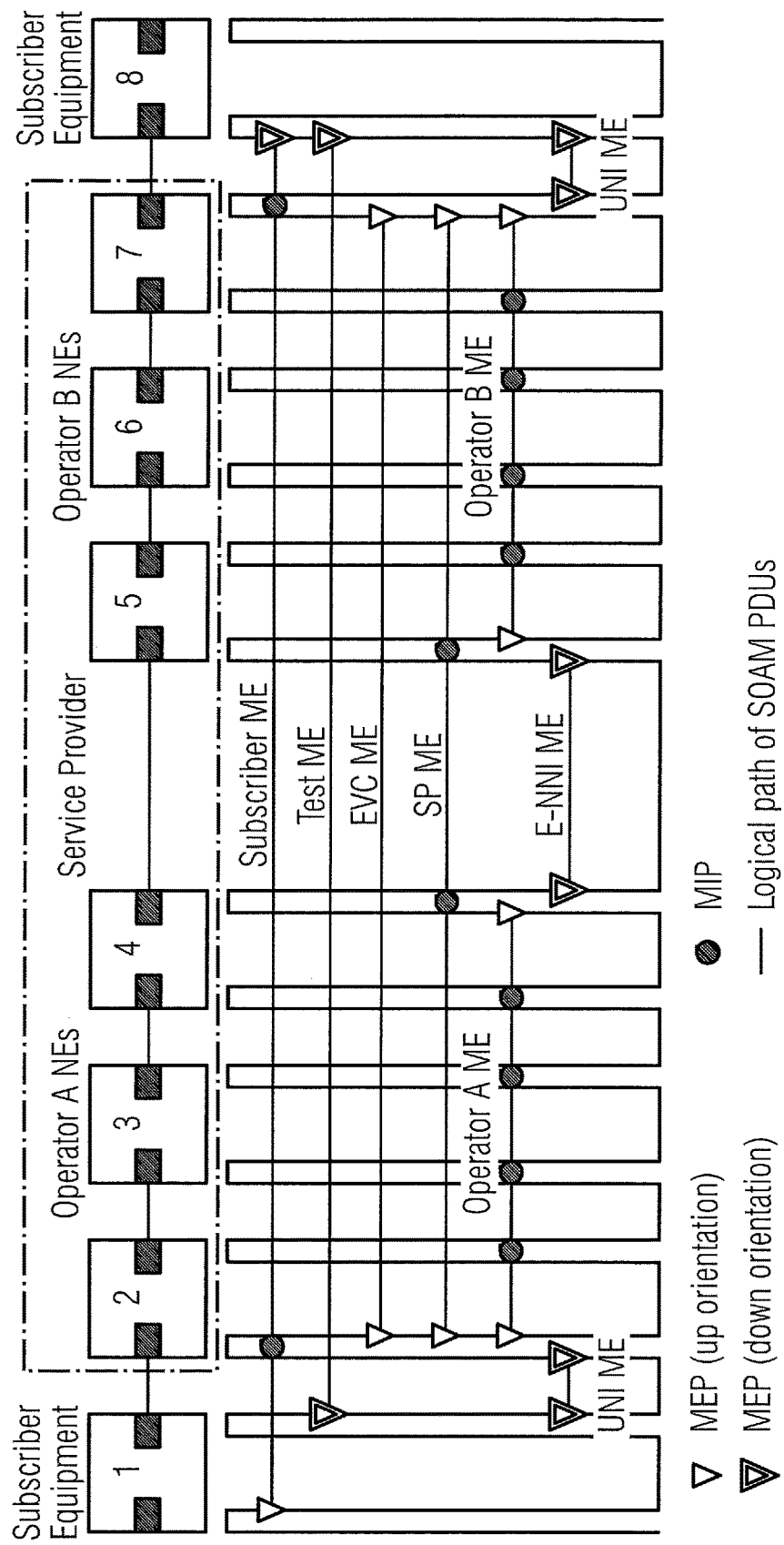
FIG. 1 illustrates schematically a multi-domain Ethernet Service OAM network underlying the present invention.

FIG. 1 shows a schematic diagram of a multi-domain Ethernet Service OAM underlying the present invention.

A multi-domain network can comprise subnetworks with maintenance domains. A service network is partitioned into customer, provider and operator maintenance levels. A service provider has end-to-end service responsibility. Operators provide service transport across a subnetwork of the multi-domain network. The Ethernet layer consists of customer service Ethernet frames that may include both customer VLAN tags and provider VLAN tags. The server/transport layer consists of underlying packet transport links. These transport links can be single-hop Ethernet links or multi-hop MPLS pseudowire or SONET/SDH paths. For Ethernet links Ethernet OAM can be used. All monitoring or measuring in the network is done between two well-defined points in the network, i.e. a Maintenance Entity ME. A Maintenance Entity is generally an entity that requires management. A Maintenance Entity Group, MEG, includes a set of Maintenance Entities ME that satisfy the following conditions. The Maintenance Entities in a Maintenance Entity Group, MEG, exist in the same administrative domain and have the same Maintenance Entity Level, MEL. Further, Maintenance Entities in a Maintenance Entity Group, MEG, belong to the same service provider VLAN. All of the Maintenance Entities MEs are associated with the same point-to-point or multi-point Ethernet connection and are grouped together within a Maintenance Entity Group or MEG. The Maintenance Entity Group, MEG, can have one Maintenance Entity, ME, or more than one Maintenance Entity, ME. For a point-to-point Ethernet connection, a Maintenance Entity Group, MEG, contains a single Maintenance Entity, ME. For a multi-point Ethernet connection, a Maintenance Entity Group, MEG, contains n×(n−1)/2 Maintenance Entities, wherein n is the number of Ethernet connections end points. End points of a Maintenance Entity, ME, are called Maintenance Entity Group, MEG, End Points or MEPs. All SOAM transactions are initiated by MEPs. The MEP is a maintenance functional entity that generates and receives OAM frames. The MEG can have points set in the network between MEPs. These points are called MIPs or MEG Intermediate Points. These are primarily used for fault isolation and can respond to SOAM transactions but not initiate them. MIP is a maintenance functional entity that is located at intermediate points along the end-to-end path, where Ethernet frames are bridged to a set of transport links. It reacts and responds to OAM frames. FIG. 1 illustrates MEP locations and MIP locations. MEPs are implemented at administrative domain boundaries of the multi-domain network as shown in FIG. 1. All maintenance entities MEs in a Maintenance Entity Group, MEG, exist in one administrative boundary. All Maintenance Entities, ME, in a Maintenance Entity Group, MEG, have the same MEG level. Further, all Maintenance Entities in a Maintenance Entity Group, MEG belong to the same point-to-point Ethernet connection or a multi-point Ethernet connectivity. Maintenance Entity Group, MEG, End Points, are points at the edge of the domain and define the boundary of the network domain. The MEPs can send and receive connectivity fault management, CFM, frames through a relay function, drop CFM frames of its level or lower. In contrast, MIPs are points internal to a network domain and not located at the boundary. CFM frames are received from MEPs or other MIPs and can be catalogued and forwarded, wherein all CFM frames at a lower level are stopped and dropped. MIPs are passive points and respond only when triggered by CFM trace route and loop back messages.

As can be seen in FIG. 1, the MEPs can comprise UP MEPs and DOWN MEPs. If an OAM flow is being sent out of a specific port of a user network interface, UNI, or network-network interface, NNI, such as with the UNI ME or the ENNI ME, the MEG End Point MEPs is called a DOWN MEP. OAM flows from a DOWN MEP are always initiated through the same port. For a DOWN MEP one sends OAM packets to a port x. If an OAM is being sent to a destination in the network such as with the Ethernet virtual connection, EVC, Maintenance Entity, ME, the MEG intermediate point, MEP, is called an UP MEP. The path taken by OAM flows from an UP MEP can change if the network topology changes, e.g. due to the addition, removal or failure of a path. For an UP MEP, OAM packets are sent to an address y or a VLAN z. In an UP MEP, CFM PDUs generated by the MEP are sent towards a bridge's relay function and not via the wire connected to the port where the MEP is configured. In contrast, in a DOWN MEP, CFM PDUs generated by the MEP are sent via the wire connected to the port, where the MEP is configured. DOWN MEPs are typically used for MEs spanning a single link, whereas UP MEPs are commonly used for a wider reach such as end-to-end connections going beyond a single link.

The Metro Ethernet Forum, MEF, has defined a layered separation of Ethernet subnetworks using a VLAN stacking mechanism, where each subnetwork created by an encapsulating stacked VLAN tag has a separate set of eight MEG levels. Each MEG level can be configurable, wherein a default value is given for different MEGs. The eight different MEG levels of a stacked tag subnetwork cannot extend beyond the respective subnetwork. Each subnetwork is only aware of its own eight MEG levels. It is possible that the Ethernet Service OAM frames have a format including a ME level corresponding to the administrative domains illustrated in FIG. 1. A numerical higher ME level or MEG level corresponds to domains with a greater physical reach. For instance, MEG levels 5 to 7 are reserved for customer domains, MEG levels 3 and 4 are reserved for service provider domains and MEG levels 0 to 2 are reserved for operator domains. In a possible embodiment, the Ethernet Service OAM frame format can comprise further fields, in particular a version field facilitating the developments of future extensions of the initial Ethernet Service OAM protocol, opcodes indicating the OAM message type, flags and a TLV, Type Length Value, of said field. In a conventional multi-domain network comprising subnetworks delimited by a Maintenance Entity Group, MEG, End Points, MEPs, the coordination of SOAM MEG levels is difficult. End-to-end Ethernet virtual connections, EVC, in global networks are often built on nested or chained services. These kinds of nested or chained services often have overlapping MEG levels. In a conventional multi-domain network service providers and operators are using the MEF defined default SOAM levels for their services with no MEG level flexibility in their service offerings.

Figure 2:
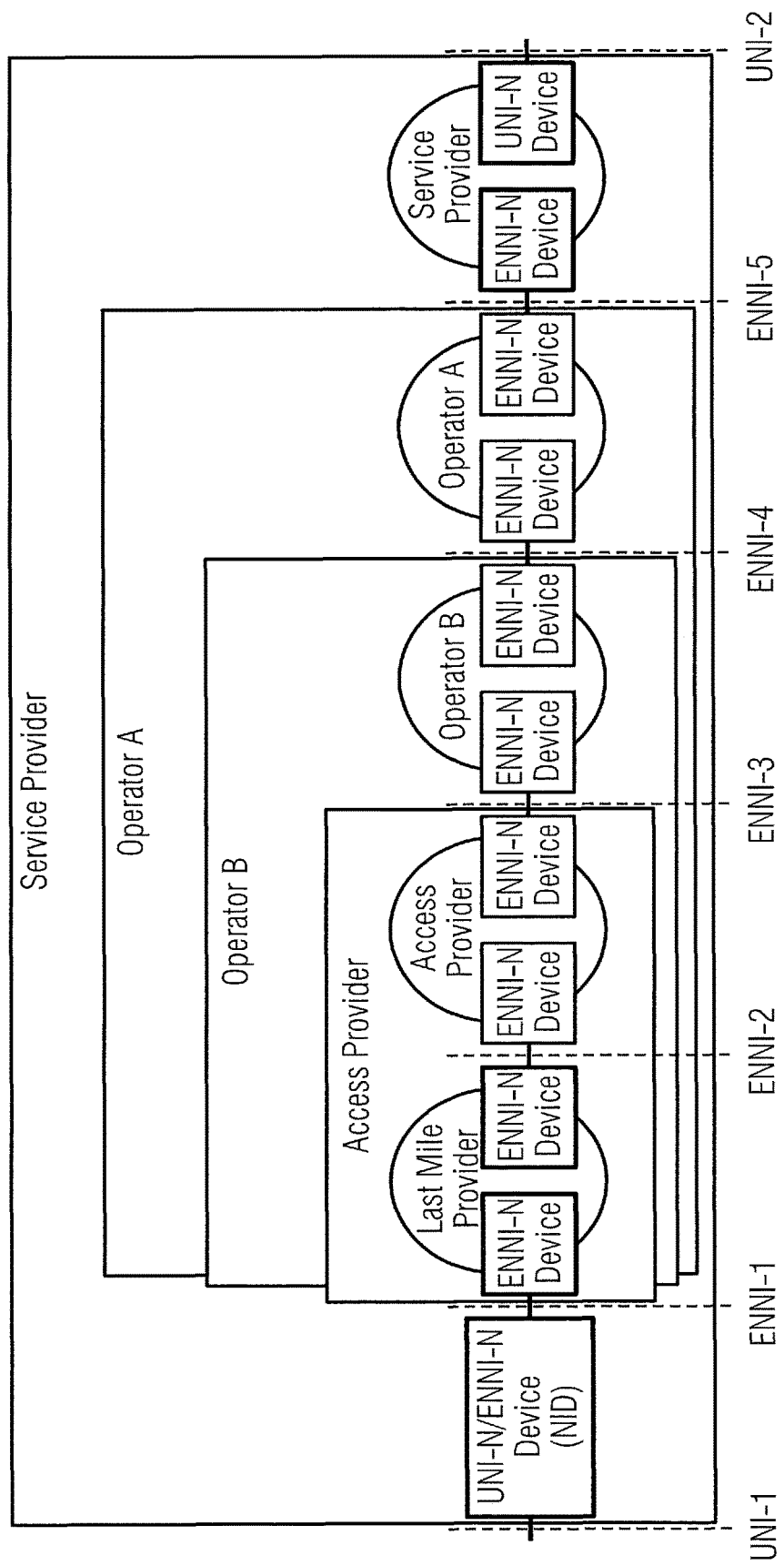
FIG. 2 shows schematically an exemplary nested multi-domain Ethernet Service OAM describing a problem underlying the present invention.

FIG. 2 shows an exemplary multi-domain network with nested services which can cause overlapping MEG levels. In the exemplary multi-domain network of FIG. 2, a service provider SP serves an end-to-end subscriber service that reaches the customer site using an out-of-franchise operator for access connection. Accordingly, the service provider buys a service from an operator A to reach remote subscriber sites. The operator A uses in the shown example his own network to reach the region, but must use another operator B for the remaining access connection. For instance, an operator A does not have any connectivity in a country and buys a service from an operator B. Operator B uses his own network to reach the access area but does not have fiber connections in the region and buys a service from a local access provider. Moreover, in the given example, the access provider does not own the last-mile and buys service from a last-mile provider. In this kind of multi-domain network as illustrated in FIG. 2 overlapping MEG levels or MEG level conflicts may occur terminating the desired service.

Figure 3:
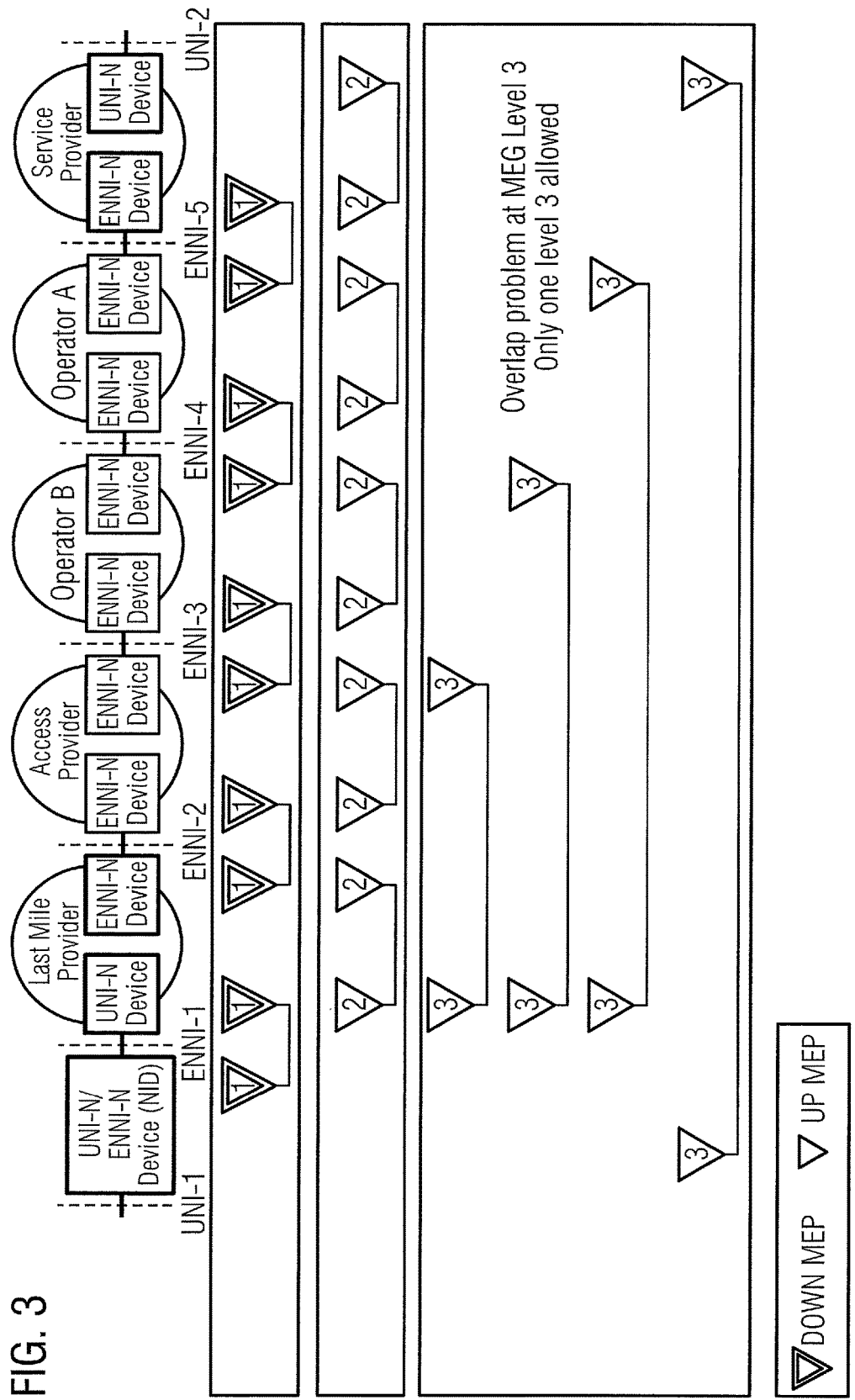
FIG. 3 shows schematically an exemplary multi-domain Ethernet Service OAM with overlapping MEG levels illustrating a problem underlying the present invention.

FIG. 3 illustrates an overlap problem at MEG level 3. ENNI MEG level 1 is used to monitor a connection between operators. Operator MEG level 2 monitors a connection across an operator CEN. Each nested provider uses an operator MEG for monitoring the local network and needs to use a service provider, SP, MEG level for access EPL to UNI.

Figure 4:
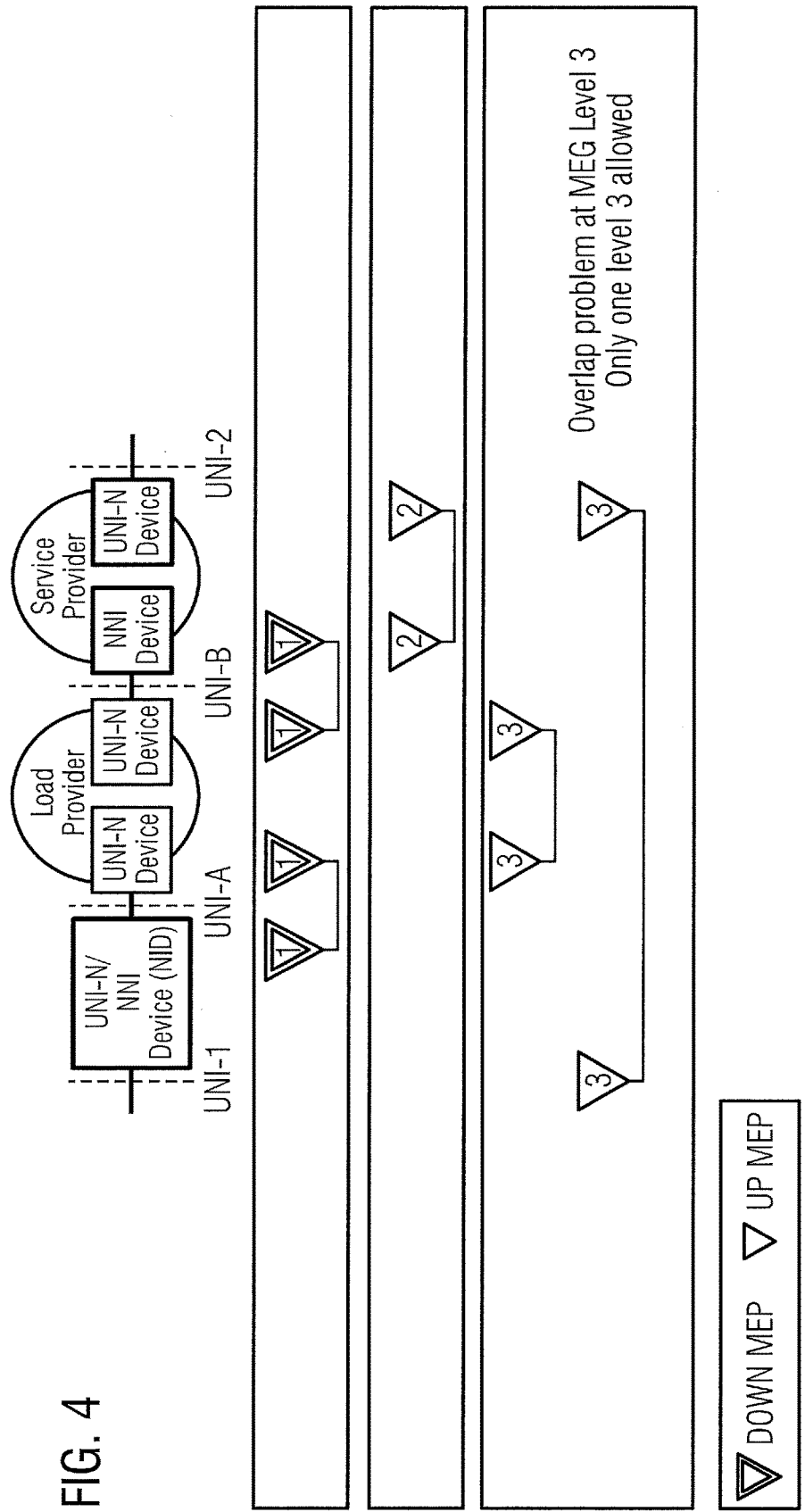
FIG. 4 shows a further exemplary multi-domain Ethernet Service OAM with chained subnetworks with overlapping MEG levels illustrating a problem underlying the present invention.

FIG. 4 illustrates a similar SOAM overlap in a chained multi-domain network. Similar to FIG. 3, there is an overlap at MEG level 3.

In the multi-domain network according to the first aspect of the present invention, the multi-domain network comprises subnetworks delimited by Maintenance Entity Group, MEG, End Points, MEPs, of a Maintenance Entity Group, MEG, wherein the MEPs are configured to encapsulate Service Operation Administration Maintenance, SOAM, frames received by the MEP and to forward the encapsulated SOAM frames to a peer MEP of said MEP within the same Maintenance Entity Group, MEG. The SOAM frame encapsulation as performed in the multi-domain network according to the first aspect of the present invention allows SOAM frames of any MEG level to traverse a subnetwork segment regardless of the MEG levels used within the subnetwork segment. In the multi-domain network according to the first aspect of the present invention, SOAM frames of any MEG level are allowed to be tunneled through an operator service regardless of whether the associated service encapsulation with VLAN stacking is available. This SOAM frame tunneling can be performed by the service provider of the service as an added value to their customer. Further, it is possible that the SOAM frame tunneling can be performed by the subscriber of the service as a way to be agnostic to the MEG levels used by the operator of the service provider. With the multi-domain network according to the first aspect of the present invention, it is possible to extend and reuse MEG levels across multiple operators while maintaining existing service frame encapsulation. In a possible embodiment of the multi-domain network according to the first aspect of the present invention, each Maintenance Entity Group, MEG, End Points, MEPs, comprises a passive Service Access Point, SAP, which is adapted to receive the SOAM frames and an active Service Access Point, adapted to forward after encapsulation by the MEP the encapsulated SOAM frames to the peer MEP of said MEP within the same Maintenance Entity Group, MEG.

Figure 5:
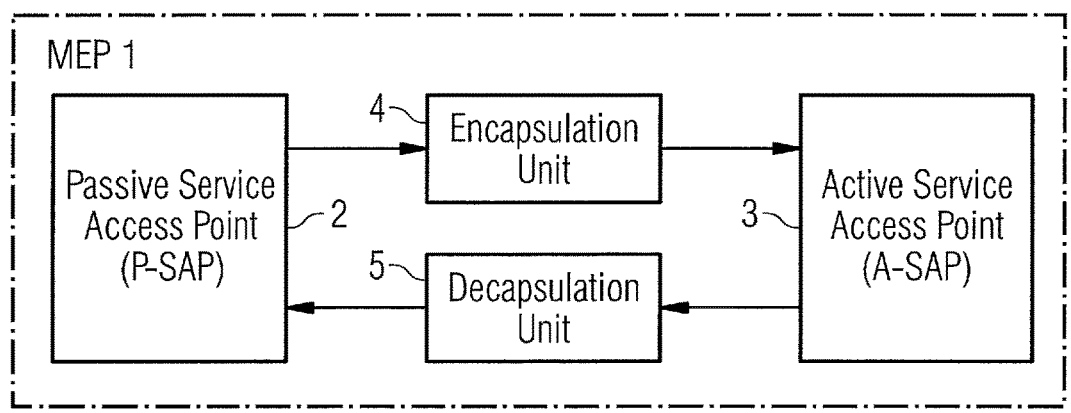
FIG. 5 shows a block diagram for illustrating a possible exemplary embodiment of a Maintenance Entity Group, MEG, End Point, MEP, according to an aspect of the present invention.

FIG. 5 shows a block diagram of a possible exemplary embodiment of a Maintenance Entity Group, MEG, End Point, MEP 1, which can be used in a multi-domain network according to the first aspect of the present invention.

The Maintenance Entity Group, MEG, End Point, MEP 1, of a subnetwork within the multi-domain network comprises in the shown embodiment a passive Service Access Point, SAP, 2 adapted to receive SOAM frames and an active Service Access Point, SAP, 3 adapted to forward SOAM frames to a peer MEP of said MEP 1 within the same Maintenance Entity Group MEG. The Maintenance Entity Group, MEG, End Point, MEP 1, comprises an encapsulation unit 4 configured to encapsulate SOAM frames received by the passive SAP 2 of the MEP 1 and a decapsulation unit 5 configured to decapsulate encapsulated SOAM frames received by the active SAP 3 of the MEP 1. The encapsulation unit 4 is configured in a possible embodiment to encapsulate the received SOAM frames at any or a particular MEG level. The Maintenance Entity Group, MEG, End Point, MEP 1, shown in FIG. 5, is associated with a subnetwork within the multi-domain network. The subnetwork can comprise a network of a service provider SP, a network of a network operator or a network of an access provider. The MEP 1 as illustrated in FIG. 5 can be an UP MEP or a DOWN MEP. In a possible embodiment, the MEP 1 can also comprise a configuration register storing the MEG level of the respective MEP. An MEG level overlap is avoided by tunneling SOAM frames received on the passive SAP 2 of the MEP 1 to the peer MEP. The SOAM frames received on the passive SAP 2 are encapsulated by the encapsulation unit 4 within a SOAM frame at the MEG level of the MEP 1 to be decapsulated and forwarded by the peer MEP. The service provider may perform the SOAM encapsulation so that its network can accept and forward any MEG level. In this embodiment, the encapsulation of SOAM frames received from the customer network is performed by an UP MEP at the external network-network interface, NNI. A customer or subscriber can perform the SOAM encapsulation so that SOAM frames are at a higher level than those of a provider network. In this embodiment, the encapsulation of the SOAM frames transmitted by the customer network can be performed by a DOWN MEP at the external network-network interface, NNI.

Figure 6:
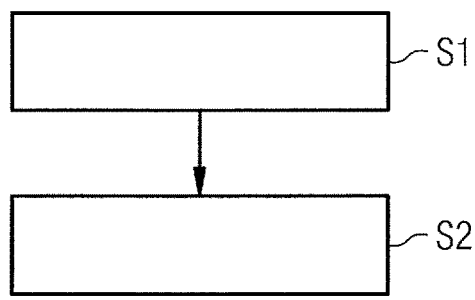
FIG. 6 shows a flow chart for illustrating a possible exemplary embodiment of a method for transporting Service Operation Administration Maintenance, SOAM, frames through a multi-domain network according to a further aspect of the present invention.

FIG. 6 shows an exemplary embodiment of a method for transporting Service Operation Administration Maintenance, SOAM, frames through a multi-domain network comprising subnetworks delimited by Maintenance Entity Group, MEG, End Points, MEPs, of a Maintenance Entity Group, MEG, according to a further aspect of the present invention. The method comprises in a first step S1 encapsulating the received SOAM frames by a MEP. In a further step S2, the encapsulated SOAM frames are forwarded to a peer MEP of said MEP within the same Maintenance Entity Group, MEG. The SOAM frames are received at a passive Service Access Point, SAP, of the MEP and forwarded after encapsulation via an active SAP of the MEP to the peer MEP of said MEP within the same Maintenance Entity Group, MEG. The forwarded encapsulated SOAM frames are received by an active SAP of the peer MEP and decapsulated by the peer MEP to be forwarded.

Figure 7:
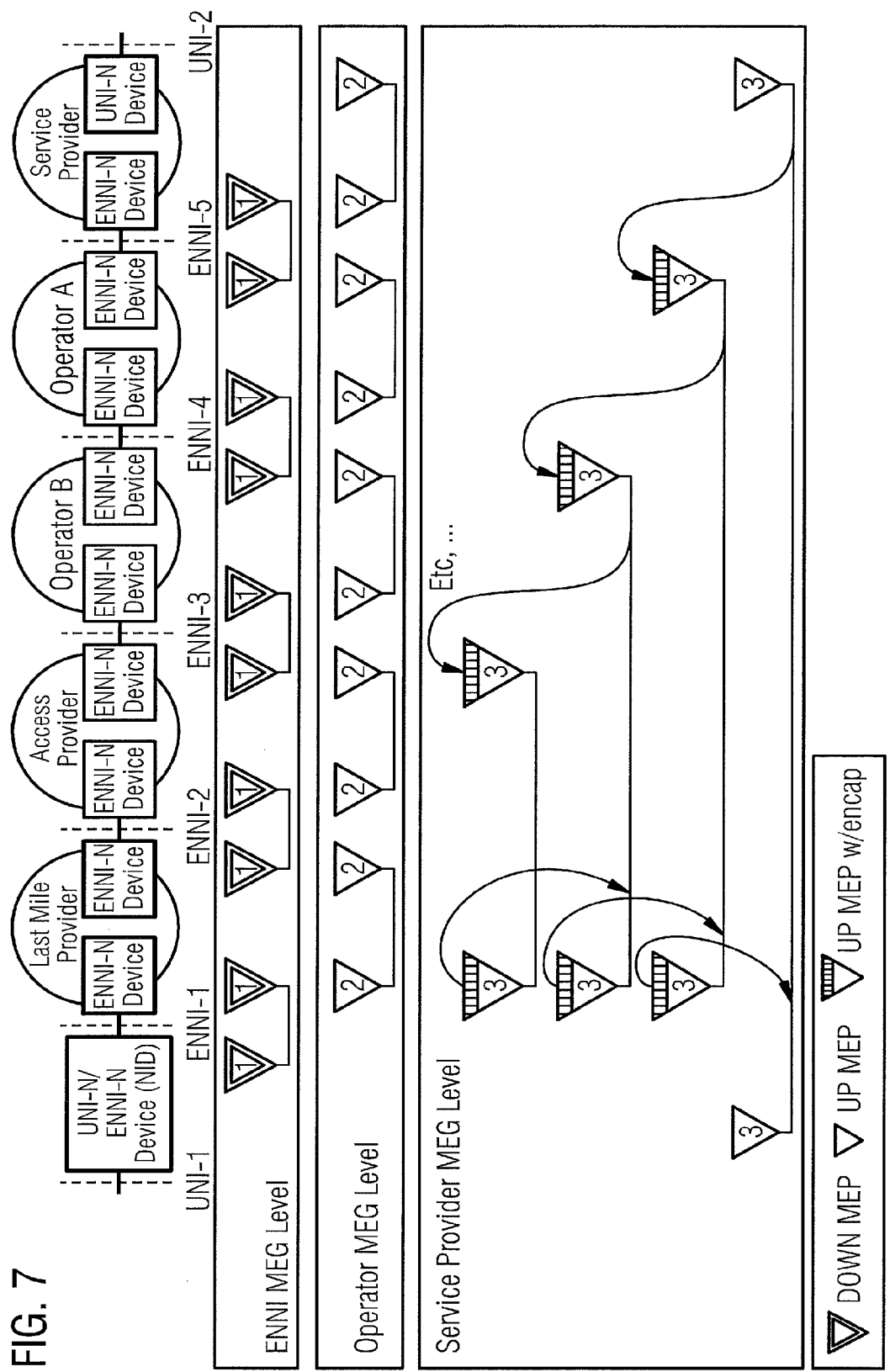
FIG. 7 shows a schematic diagram for illustrating the separation of a multi-domain network according to an aspect of the present invention.

FIG. 7 shows a schematic diagram for illustrating an SOAM encapsulation of an exemplary multi-domain network using the method as illustrated in FIG. 6. As can be seen in FIG. 7, an SOAM frame received by the MEP of an ENNI-N device of an operator A from an ENNI-N device of a service provider SP is encapsulated by an encapsulation unit 4 of said MEP and forwarded to network operator B. The ENNI-N device of operator B is connected to the domain of operator A and the respective MEP performs again an encapsulation and forwards the encapsulated SOAM frame to the ENNI-N device of the access provider as illustrated in FIG. 7. At the MEP of the ENNI-N device of the access provider, a third encapsulation of the SOAM frame is performed and the encapsulated SOAM frame is sent to the peer MEP within the ENNI-N device of the last-mile provider. As can be seen in FIG. 7, multiple MEPs providing SOAM frame decapsulation may reside in the same port. The UP MEP in the ENNI-N device of the last-mile provider performs the first, second and third decapsulation to reach the service provider MEG level as illustrated in FIG. 7.

Figure 8:
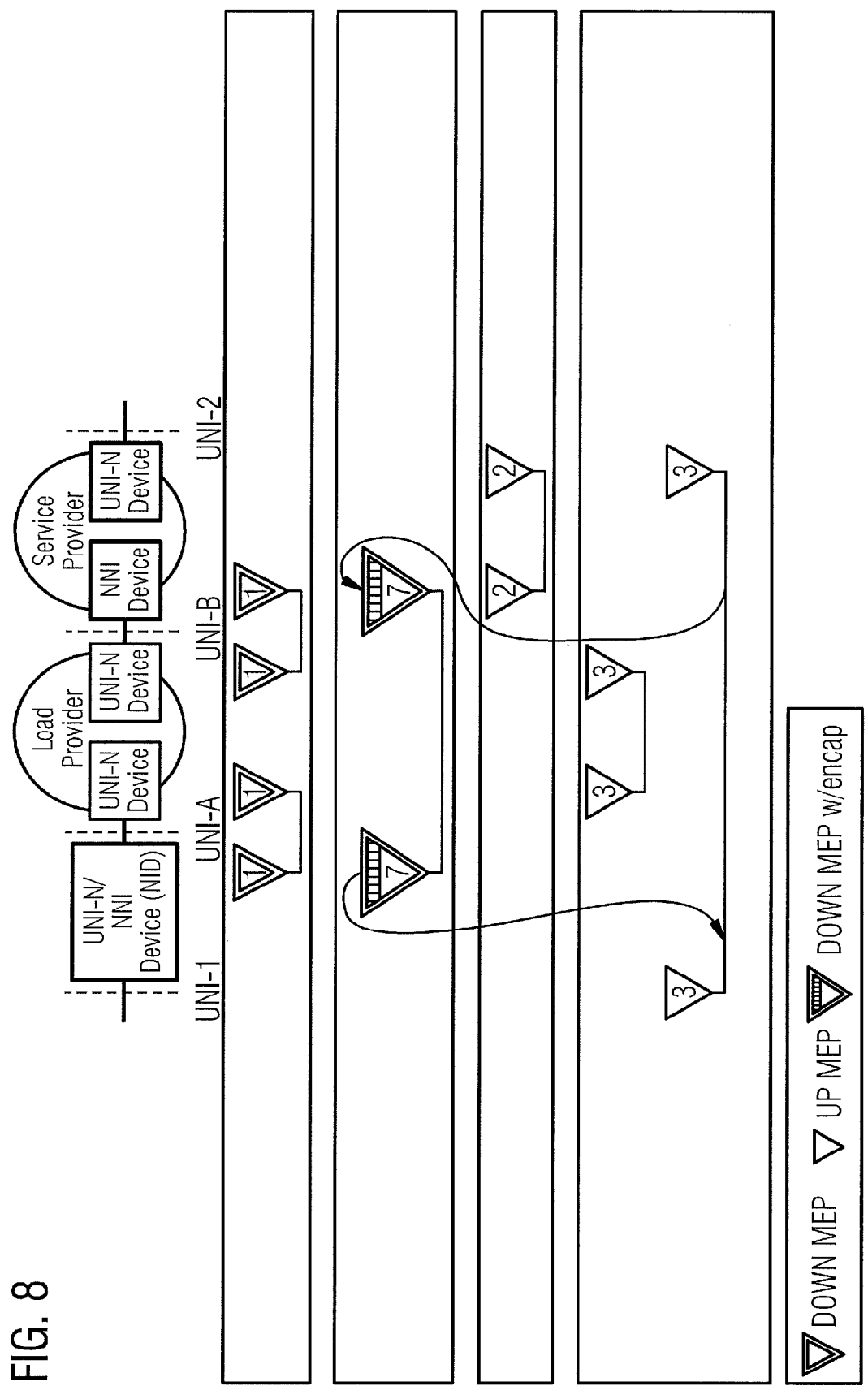
FIG. 8 shows a further schematic diagram for illustrating the separation of a multi-domain network according to an aspect of the present invention.

FIG. 8 shows a further diagram for illustrating a possible exemplary operation of a multi-domain network using the method as illustrated in FIG. 6. In the illustrated example, the encapsulation MEG level is selected to be high enough to traverse local providers SOAM MEG levels. The connection across a service provider SP's local CEN is monitored at the operator MEG level. At the service provider MEG level, a local provider provides EVC using the SP level tunneled by the encapsulation MEG. A local provider does not detect the MEG overlap as illustrated in FIG. 8.

Figure 9:
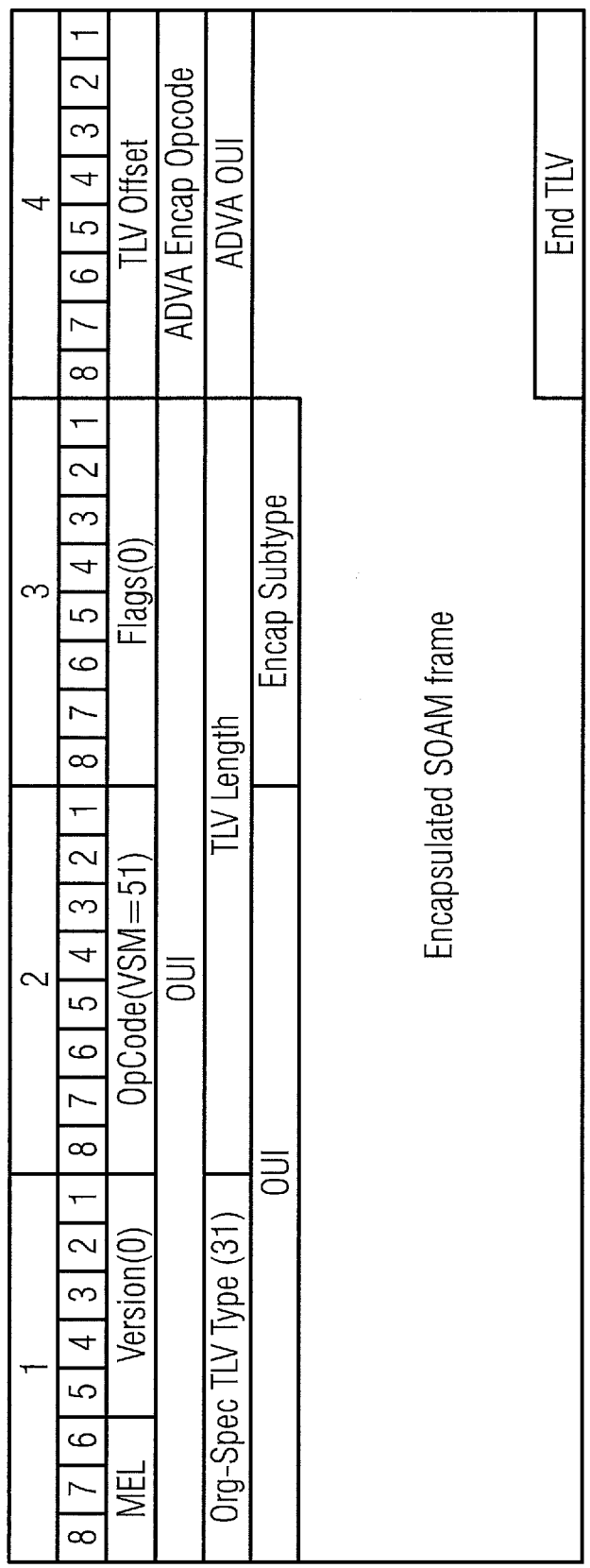
FIG. 9 shows a schematic diagram for illustrating a possible exemplary embodiment of a SOAM frame which can be used by an apparatus and method according to the present invention.

FIG. 9 shows an exemplary frame format which can be used by the method and apparatus according to the present invention. In a possible embodiment, the encapsulation can be within a vendor specific message, VSM. In a possible embodiment, the encapsulation unit 4 of the MEP 1 encapsulates the received SOAM frames by adding a header to the SOAM frames. As illustrated in FIG. 9, the header can comprise a MEL (Maintenance Entity Level) data field storing the MEG level value of the MEG level of the MEP 1. The added header can further comprise a protocol version, an opcode, flags, a TLV offset and an organizational unique identifier, OUI. Instead of an organizational unique identifier, OUI, a unique opcode specific for encapsulation can be used. This opcode can be assigned by an SDO such as IEEE or ITU. The frame format can use a common CFM header, but the remaining frame format can be defined by the respective SDO. In the illustrated embodiment, the MEL data field of the header comprises at least 3 bits to distinguish at least 8 different MEG levels. In a possible embodiment, the MEP 1 as illustrated in FIG. 5 can be integrated in an interface device of a multi-domain network. The interface device can comprise a user network interface, UNI, and/or a network-network interface, NNI, device.

The invention claimed is:

1. A multi-domain network comprising:
   a plurality of subnetworks including at least two operator networks;
   at least two External Network-to-Network Interfaces, ENNIs, one for each operator network, at an interface between the operator networks; and a Maintenance Entity Group, MEG, comprising MEG End Points, MEPs, of the MEG that span over the ENNIs;
wherein the MEPs are configured to avoid MEG level overlap between the operator networks by tunneling Service Operation Administration Maintenance (SOAM) frames received on a passive Service Access Point (SAP) of the MEP to a peer MEP by encapsulating SOAM frames received by the MEP and forwarding the encapsulated SOAM frames to the peer MEP of the MEP over the interface between the operator networks;
wherein the passive SAP of the MEP is adapted to receive the SOAM frames and an active SAP is adapted to forward after encapsulation by the MEP the encapsulated SOAM frames to the peer MEP of said MEP within the same MEG.

2. The multi-domain network according to claim 1, wherein the peer MEP comprises an active SAP adapted to receive the encapsulated SOAM frames and a passive SAP adapted to forward the decapsulated SOAM frames after decapsulation by said peer MEP.

3. The multi-domain network according to claim 1, wherein the Maintenance Entity group, MEG, comprises Maintenance Entities, MEs, associated with the same point-to-point or point-to-multipoint Ethernet connection.

4. The multi-domain network according to claim 1, wherein each Maintenance Entity Group, MEG, has a MEG level associated with it.

5. The multi-domain network according to claim 1, wherein the subnetworks of said multi-domain network are nested and/or chained with each other.

6. The multi-domain network according to claim 1, wherein each MEP comprises:
an encapsulation unit configured to encapsulate SOAM frames received at a passive SAP of the MEP and
a decapsulation unit configured to decapsulate encapsulated SOAM frames received at an active SAP of the MEP.

7. A Maintenance Entity Group, MEG, End Point, MEP, of a Maintenance Entity Group, MEG, which spans over at least two External Network-to-Network Interfaces, ENNIs, including one ENNI for each subnetwork of at least two operator networks within a multi-domain network, each ENNI being at an interface between the operator networks, said MEP comprising:
an encapsulation unit configured to avoid MEG level overlap between the operator networks by tunneling Service Operation Administration Maintenance (SOAM) frames received on a passive Service Access Point (SAP) of the MEP to a peer MEP by encapsulating SOAM frames received by the SAP of the MEP and forwarding the encapsulated SOAM frames to the peer MEP over the interface between the operator networks; and
a decapsulation unit configured to decapsulate encapsulated SOAM frames received by an active SAP of the MEP;
wherein the passive SAP of the MEP is adapted to receive the SOAM frames and an active SAP is adapted to forward after encapsulation by the MEP the encapsulated SOAM frames to the peer MEP of said MEP within the same MEG.

8. The Maintenance Entity Group End Point, MEP, according to claim 7, wherein the encapsulation unit is configured to encapsulate the received SOAM frames at any or specific MEG levels.

9. The Maintenance Entity Group End Point, MEP, according to claim 7, wherein the subnetwork comprises a network of a service provider, a network of a network operator or a network of an access provider.

10. The Maintenance Entity Group End Point, MEP, according to claim 7, wherein the MEP comprises an UP MEP or a DOWN MEP.

11. The Maintenance Entity Group End Point, MEP, according to claim 7, wherein the MEP comprises a configuration register storing the MEG level of said MEP.

12. An interface device of a multi-domain network comprising a Maintenance Entity Group End Point, MEP, of a Maintenance Entity Group, MEG, which spans over at least two External Network-to-Network Interfaces, ENNIs, including one ENNI for each subnetwork of at least two operator networks of the multi-domain network, each ENNI being at an interface between the operator networks, said MEP comprising:
an encapsulation unit configured to avoid MEG level overlap between the operator networks by tunneling Service Operation Administration Maintenance (SOAM) frames received on a passive Service Access Point (SAP) of one MEP to a peer MEP by encapsulating SOAM frames received at the passive SAP of the MEP and forwarding the encapsulated SOAM frames to the peer MEP over the interface between the operator networks; and
a decapsulation unit configured to decapsulate encapsulated SOAM frames received at an active SAP of the MEP;
wherein the passive SAP of the MEP is adapted to receive the SOAM frames and an active SAP is adapted to forward after encapsulation by the MEP the encapsulated SOAM frames to the peer MEP of said MEP within the same MEG.

13. The interface device according to claim 12, wherein the interface device comprises a user network interface, UNI, device or a network-network interface, NNI, device.

14. A method for transporting Service Operation Administration Maintenance (SOAM) frames through a multi-domain network comprising a plurality of subnetworks including at least two operator networks and at least two Maintenance Entity Group, MEG, End Points, MEPs, of a Maintenance Entity Group, MEG, which spans over at least two External Network-to-Network Interfaces, ENNIs, one for each operator network, at an interface between the operator networks, the method comprising:
avoiding MEG level overlap between the operator networks by tunneling SOAM frames received on a passive Service Access Point (SAP) of the MEP to a peer MEP by encapsulating received SOAM frames by a MEP; and
forwarding the encapsulated SOAM frames to the peer MEP of said MEP within the same Maintenance Entity Group, MEG over the interface between the operator networks, wherein the SOAM frames are received by the passive SAP of said MEP and forwarded after encapsulation via an active SAP of said MEP to the peer MEP of said MEP within the same MEG.

15. The method according to claim 14, wherein the forwarded encapsulated SOAM frames are received by an active SAP of the peer MEP and decapsulated by the peer MEP to be forwarded.

16. The method according to claim 14, wherein the MEP encapsulates the received SOAM frames by adding a header to said SOAM frames, said header comprising a MEL data field storing the MEG level value of the MEG level of said MEP.

17. The method according to claim 16, wherein the added header further comprises a protocol version, an opcode, flags, a TLV offset and an organizational unique identifier, OUI, and/or a standardized opcode specific to encapsulation.

18. The method according to claim 16, wherein the MEL data field of the header comprises at least 3 bits to distinguish at least 8 different MEG levels.

\* \* \* \* \*